United States Patent [19]

Matsushima

[11] Patent Number: 5,649,219
[45] Date of Patent: Jul. 15, 1997

[54] MICROCOMPUTER HAVING A REGION DEFINABLE BY USER

[75] Inventor: Osamu Matsushima, Tokyo, Japan

[73] Assignee: NEC Corporation, Tokyo, Japan

[21] Appl. No.: 708,884

[22] Filed: Sep. 4, 1996

Related U.S. Application Data

[63] Continuation of Ser. No. 149,198, Nov. 9, 1993, abandoned.

[30] Foreign Application Priority Data

Nov. 10, 1992 [JP] Japan ................................. 4-299427

[51] Int. Cl.⁶ .................................................. G06F 11/00
[52] U.S. Cl. ................................. 395/800; 395/183.19
[58] Field of Search ............................. 395/775, 183.19, 395/821; 371/22.1

[56] References Cited

U.S. PATENT DOCUMENTS

| | | | |
|---|---|---|---|
| 4,922,441 | 5/1990 | Tsukagoshi et al. | 364/491 |
| 5,087,839 | 2/1992 | Whittaker et al. | 307/465 |
| 5,087,953 | 2/1992 | Whittaker et al. | 357/40 |
| 5,157,781 | 10/1992 | Harwood et al. | 395/575 |
| 5,228,139 | 7/1993 | Miwa et al. | 395/575 |
| 5,313,583 | 5/1994 | Yokota et al. | 395/275 |
| 5,369,646 | 11/1994 | Shikatani | 371/22.5 |
| 5,386,550 | 1/1995 | Yumioka et al. | 395/575 |
| 5,404,526 | 4/1995 | Dosch et al. | 371/22.1 |
| 5,426,744 | 6/1995 | Sawase et al. | 395/375 |
| 5,428,808 | 6/1995 | Sawase et al. | 395/800 |

FOREIGN PATENT DOCUMENTS 60-013266  1/1985  Japan .

*Primary Examiner*—Ayaz R. Sheikh
*Attorney, Agent, or Firm*—Whitham, Curtis, Whitham & McGinn

[57] ABSTRACT

In a microcomputer with built-in SOG region system debugging is made possible using a gate array provided outside the microcomputer by supplying signals transferred between a CPU and the gate array to external terminals used for transferring signals between the interior of the microcomputer and a peripheral device outside the microcomputer. In order to supply necessary signals to the gate array connected to the external terminals, a selection circuit which outputs signals between CPU and the SOG region to the external terminals by means of a mode switching signal is provided. By the provision of the selection circuit, it becomes possible to output the signals between the CPU and the SOG region to the external terminals by switching, and to transmit the signals of CPU to the gate array provided outside the microcomputer. Accordingly, it becomes possible to debug the system using the gate array provided outside the microcomputer.

11 Claims, 5 Drawing Sheets

MICROCOMPUTER HAVING A REGION DEFINABLE BY USER

This is a continuation of application Ser. No. 08/149,198 filed Nov. 9, 1993, now abandoned.

FIELD OF THE INVENTION

This invention relates to a one-chip microcomputer having an SOG region, and more particularly to a microcomputer in which a gate array is provided outside the one-chip microcomputer, and enables debugging of a gate array defined by the user by means of the gate array.

BACKGROUND OF THE INVENTION

In recent years, reduction in weight and size of devices that have a built-in computer, systems such as a personal computer, television receiver and, VTR, is being advanced. For this reason, integration in which various kinds of functions are incorporated in the computer is being executed. Namely, reduction in weight and size as a system is accomplished by constructing at least part of the circuits, which have been provided outside the microcomputer conventionally constructed as one chip, for realizing various kinds of functions on the one chip. For this purpose, such a microcomputer equipped is proposed that has a region which is a so-called "Sea of gate (SOG) region" definable by the user is proposed. The SOG region is generally constituted of a gate array, a master slice or a programmable logic array (PLA). By constructing a part of the circuits necessary for the system required by the user in the SOG region, it becomes possible to reduce the number of circuits provided outside the one-chip microcomputer.

Referring to FIG. 1, such a microcomputer 101 is constituted as an integrated circuit, and consists of a central processing unit (CPU) 102 which executes programs, and an SOG region 103 which receives the signal from CPU via an external terminal 1011 and carries out processing based on the signal. The central processing unit 102 is connected to the SOG region 103 via signal lines 1021, 1022 and 1023. The SOG region 103 is connected to the external terminal 1011 provided outside the one-chip microcomputer 101 via a signal line 1031. A peripheral device 104 is connected to the external terminal 1011 via a signal line 1041.

The CPU 102 executes the program and outputs an instruction to the SOG region. In response to the instruction received from CPU 102, the SOG region 103 outputs a signal and data that control the peripheral device 104 to the peripheral device 104 via the external terminal 1011. The peripheral device executes processing based on the received signal and the data. Here, the case of the peripheral device 104 is a printer will be described as an example. In this case, CPU 102 outputs a printing instruction to the SOG region 103. The SOG region 103 that received the instruction outputs a control signal and data to the external terminal 1011. The printer 104 that received the control signal and the data executes printing based on the received control signal and the data.

When the SOG region 103 is incorporated in the microcomputer 101, the user can carry out design of a circuit in the interior of the SOG region 103 in order to obtain a system functions required. For example, in the above example the SOG region 103 functioning as a printer interface. Then, the user confirms the operation of the SOG region 103 with a completed circuit design by a simulation that uses a work station or the like. The system required by the user is completed when the microcomputer 101 with the finished design of the SOG region 103 is loaded. However, the debugging of the completed system is impossible until a sample of the completed product in which the completed circuit design of the SOG region 103 is incorporated in the computer 101. Accordingly, it is necessary to wait until a sample of the microcomputer with the completed circuit design of the SOG region 103 becomes available. Because of this, the time from design to completion of the microcomputer 101 is prolonged. Moreover, when defects are found by debugging in the SOG region 103 of the microcomputer 101 with completed circuit design of the SOG region 103, it becomes necessary to modify the circuit design and remake the SOG region 103. Therefore, the development cost of the microcomputer 101 will have to be increased.

Furthermore, the SOG region in the microcomputer 101 is required to receive a control signal and data from CPU which is used only within the microcomputer 101. In other words, the SOG region 103 receives an internal signal and data which are not output normally to outside the microcomputer 101. Accordingly, it is not possible to design a gate array with functions needed by the user outside the microcomputer 101, and to receive an instruction from CPU 102 at this gate array. Because of this, it is not possible to carry out debugging of the system by the use of this gate array. Therefore, it is not possible to deal with the design approach in which system debugging is carried out by installing a gate array designed by the user outside the microcomputer, and to incorporate the SOG region 103 into the microcomputer when there no problem is found in the gate array.

As described in the above, a system having a microcomputer 101 with a built-in SOG region 103 has a problem in that debugging is not possible until a completed sample with finished circuit design of the SOG region 103 becomes available.

SUMMARY OF THE INVENTION

An object of the present invention is to carry out debugging of an externally provided gate array by supplying the gate array with a signal from a CPU within a one-chip microcomputer by use of external terminals of the one-chip microcomputer.

For the above object, a microcomputer is constituted of an external terminal for outputting an internal signal of the one-chip microcomputer to the outside, a CPU for executing a program, an SOG region to which the signal from the CPU is input, and a selection circuit which selects one of the outputs from the SOG region and the output from the CPU to the SOG region by a mode switching signal, and outputs it to the external terminal.

With this configuration, it is possible to output the signal between the CPU and the SOG region to the external terminal. Namely, the signal from CPU can be transmitted to the gate array provided outside the microcomputer. Accordingly, it becomes possible to debug the system using the gate array provided outside the microcomputer, making it unnecessary to wait until a sample of the microcomputer loaded with the SOG region becomes available. In other words, the design period can be shortened because of the early feasibility of the system debugging, and the development cost can also be reduced.

DETAILED DESCRIPTION OF PREFERRED EMBODIMENTS

Figure 1:
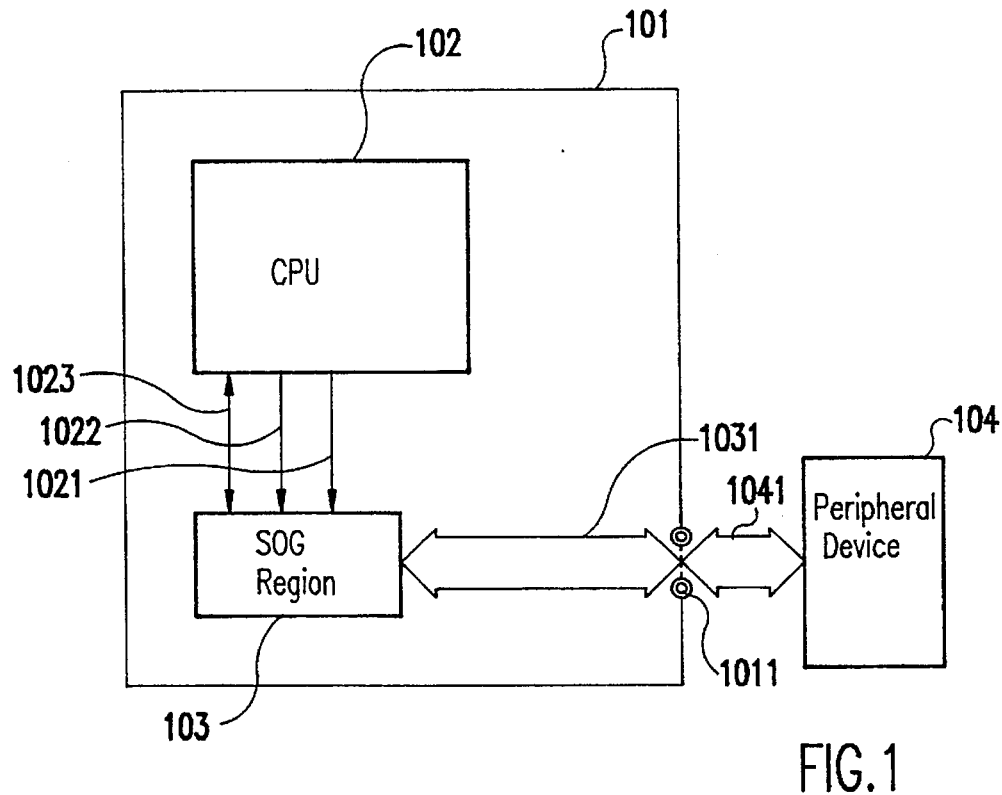
FIG. 1 is a system block diagram for a conventional microcomputer loaded with an SOG region.
Figure 2:
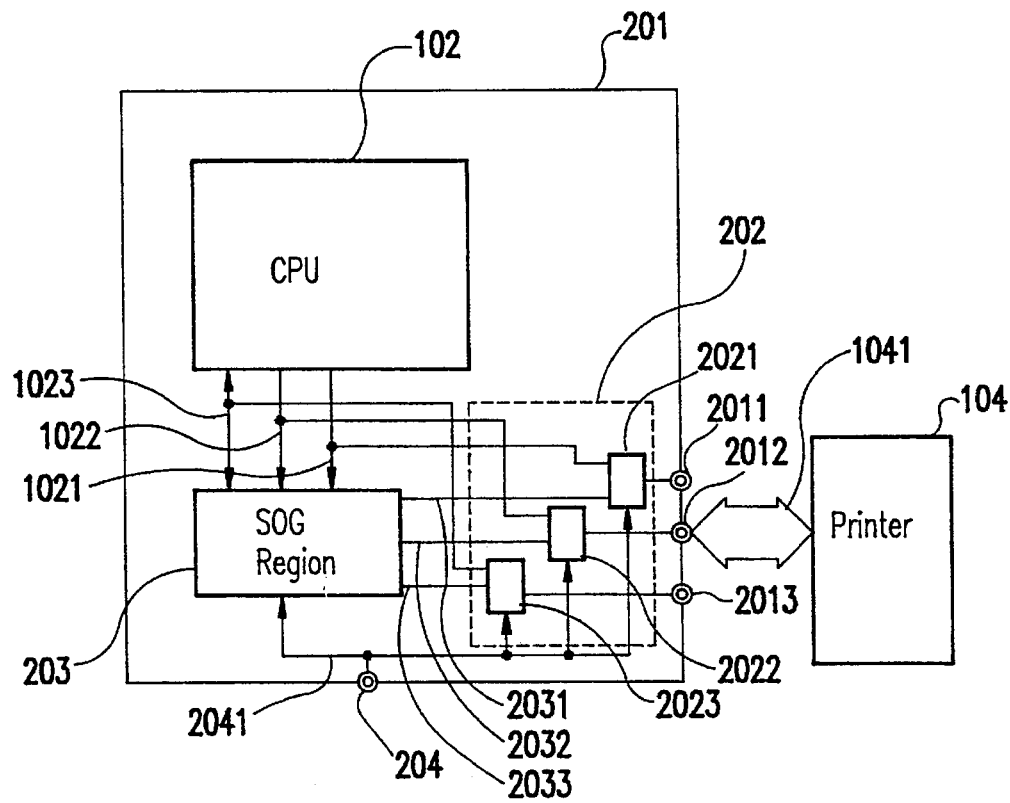
FIG. 2 is a block diagram for a first embodiment of the microcomputer system loaded with an SOG region according to this invention, at the time of normal operation of controlling a peripheral device using the SOG region.

FIG. 2 illustrates a first embodiment of the present invention. This embodiment will be described by using a printer as a peripheral device. Since a CPU 102 is identical to that in FIG. 1, its description will be omitted.

The microcomputer 201 of the first embodiment comprises the CPU 102, an SOG region 203 to which is input a signal from the CPU 102 only when a mode switching signal input from an external input terminal 204 of the microcomputer 102 indicates a normal operation mode, a selection circuit 202 which selectively outputs to external terminals 2011, 2012 and 2013 the output from the SOG region when the mode switching signal input to the external input terminal 204 is in the normal operation mode, and the output from CPU when it is in the test mode, and a printer 104 supplied with signals to the external terminals 2011, 2012 and 2013.

Here, the mode switching signal from the external input terminal 204 indicates the normal operation mode in which an output from the SOG region 203 is output to the external terminals 2011, 2012 and 2013. In other words, since the output of the SOG region 203 is input to the printer 104 via the external terminals 2011, 2012 and 2013, the operation of this system is identical to that of the system in FIG. 1, and the description of its operation will be omitted. Note, however, that the signal line 1031 in FIG. 1 is replaced in FIG. 2 by signal lines 2031, 2032 and 2033 corresponding to the signal lines 1021, 1022 and 1023 from CPU 102.

Figure 3:
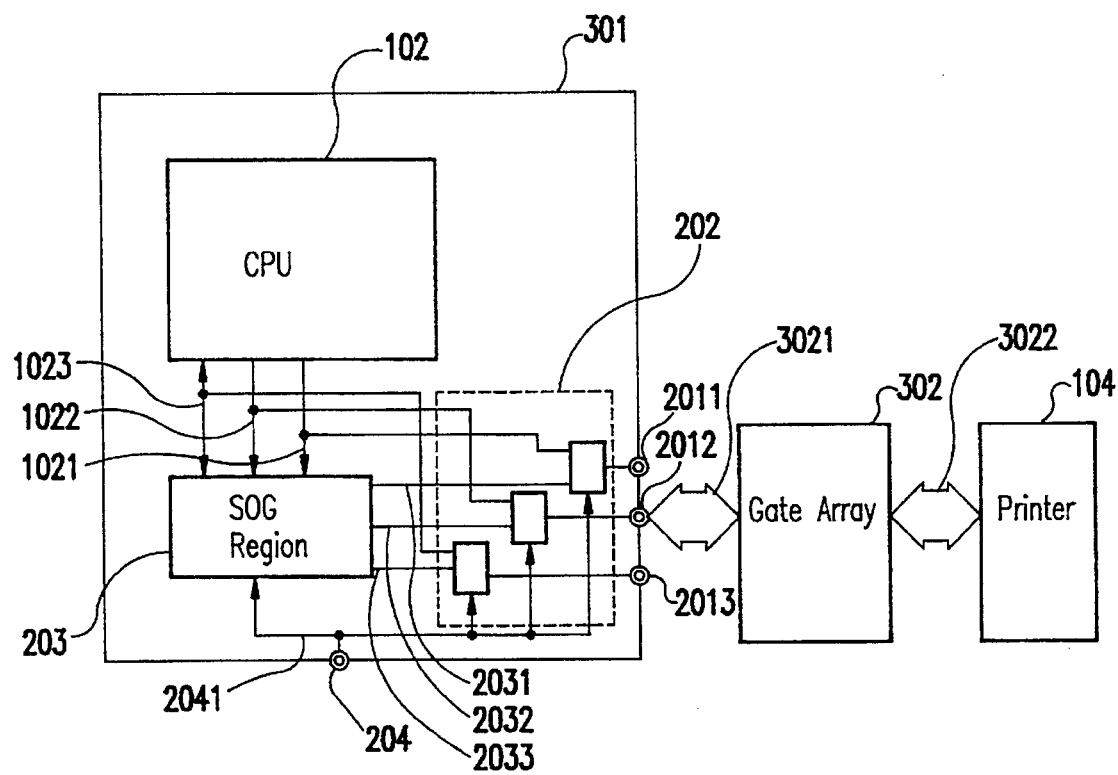
FIG. 3 is a block diagram for the first embodiment of the microcomputer system loaded with the SOG region according to this invention at the time of debugging the system that uses an externally provided alternate circuit for the SOG region.

FIG. 3 illustrate a system for carrying out system debugging by the use of an externally provided gate array when a signal showing the test mode is input to the external input terminal 204. A microcomputer 301 is constituted of CPU 102, an SOG region 203, a selection circuit 202, a gate array 302 to which are input signals from the external terminals 2011, 2012 and 2013 via a signal line 3021, and a printer 104 to which is input the output of the gate array 302 via a signal line 3022. Description about the parts identical to those in FIG. 2 will be omitted.

Namely, the case in which a mode switching signal showing the test mode is input to the external input terminal 204, and a signal of CPU 102 is output to the external terminals 2011, 2012 and 2013 is illustrated in the figure. The signal from CPU 102 output to the external terminals 2011, 2012 and 2013 is input to the gate array 302 having an interface function designed by the user. Based on the signal received, a signal is output from the gate array 302 to the printer 104. Since the printer 104 is connected to confirm the operation of the system, use of any circuit is possible as long as it is a circuit to monitor the output information from the gate array 302. As in the above, it is possible to input a signal from CPU 102 to the gate array 302 installed outside the microcomputer 301 via the external terminals 2011, 2012 and 2013. Accordingly, it is possible to carry out debugging of the system by connecting the gate array 302 to the microcomputer 301.

Figure 4:
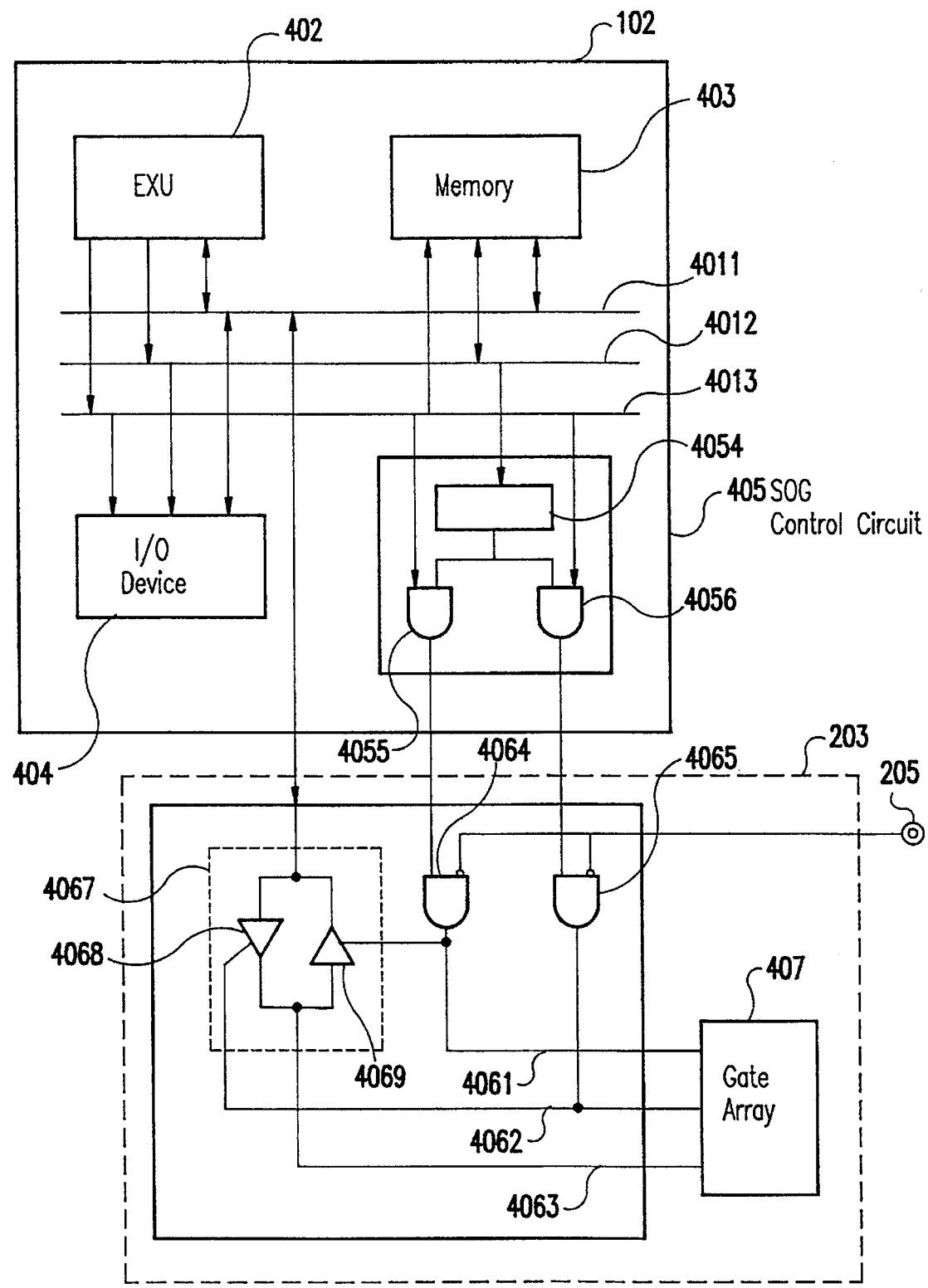
FIG. 4 is a detailed block diagram for the first embodiment of the microcomputer system loaded with the SOG region according to this invention.

Shown in FIG. 4 is a more detailed system configuration, especially the internal configuration of CPU 102, of the first embodiment of the invention. The central processing unit 102 comprises a data bus 4011 through which data is input and output, an address bus 4012 through which an address is input and output, a control bus 4013 through which a control signal such as a read or write signal is input and output, an execution unit (EXU) 402 connected to the data bus 4011, the address bus 4012 and the control bus 4013 for generating an address and a control signals, and carries out data processing, a memory 403 connected to the data bus 4011, the address bus 4012 and the control bus 4013 for storing or reading a program and data, based on the data, address and control signals, an I/O device 404 connected to the data bus 4011, the address bus 4012 and the control bus 4013 for controlling the input and output of the data, address and control signals for CPU 102, an SOG control circuit 405 connected to the data bus 401, the address bus 4012 and the control bus 4013 for outputting a control signal to signal lines 4051 and 4052 in response to an input, a switching circuit 406 connected to the signal lines 4051, 4052 and 4053 to which is input a mode switching signal from the external input terminal 204, and a gate array 407 to which is input a signal from the switching circuit 406 via signal lines 4061, 4062 and 4063.

Further, the SOG control circuit 405 comprises an address decoder circuit 4054 which outputs an activation signal when an address designating the gate address 407 is input, an AND circuit 4055 which outputs a read signal to a signal line 4041 when both the activation signal and the read signal on the control bus 4013 are activated, and an AND circuit 4056 which outputs a write signal to a signal line 4052 when both the activation signal and the write signal on the control bus 4013 are activated. To the switching circuit 406 there are input a mode switching signal supplied from the external input terminal 204, a signal from the data bus 4013, and control signals from the SOG control circuit 405 via the signal lines 4051 and 4052.

When the mode switching signal is in the normal operation mode which selects the SOG region 203, the AND circuits 4064 and 4065 to which is input the mode switching signal are activated, the signals input to the signal lines 4051, 4052 and 4053 are output by activating a tristate buffer 4068 to signal lines 4061, 4062 and 4063, respectively, which are in turn output to the gate array 407.

When the mode switching signal is in the test mode, the AND circuits 4064 and 4065 are inactivated, and the input signals are not transmitted to the signal lines 4061, 4062 and 4063 by inactivating the tristate buffers 4068 and 4069, namely, the signals on respective signal lines are not transmitted to the gate array 407. At this time, the signal lines 4051, 4052 and the data bus 4053 are connected to the external terminals via the selection circuit which is not shown. Further, the data bus 4067 within the switching circuit 406 is a bi-directional bus which is constituted of the two buffers 4068 and 4069 connected in mutually opposite directions to which are input signals of the AND circuits 4064 and 4065, respectively. At the time of reading, only the buffer 4068 on the read side is activated while at the time of writing, only the buffer 4069 on the write side is activated. In this way, the data bus 4067 transfers the data in both directions.

Figure 5:
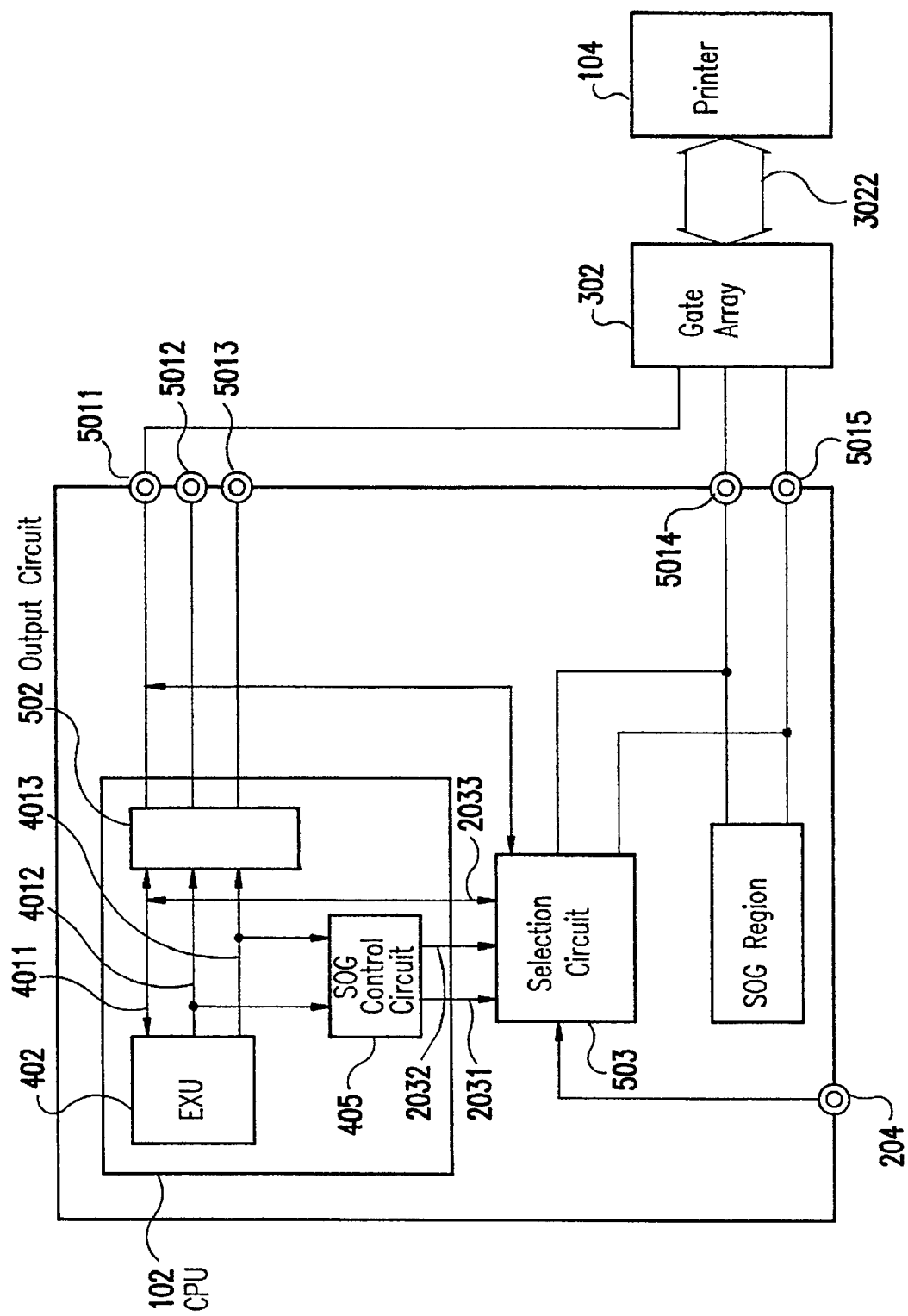
FIG. 5 is a system block diagram for a second embodiment of the microcomputer system loaded with the SOG region according to this invention.

In FIG. 5 is shown the second embodiment of the invention. A microcomputer 501 is constituted of a CPU 102, a gate array 407, and a selection circuit 503. The central processing unit 102 comprises an EXU 402 connected to a data bus 4011, an address bus 4012 and a control bus 4013, and an output circuit 502 and an SOG control circuit 405. Although a memory and an I/O controller are also connected to each bus, they are not shown in the figure. An output circuit 502 is activated only when pieces of information are output to external terminals 5011, 5012 and 5013. The selection circuit 503 connected to a write signal line 2031, a read signal line 2032 and a data bus 2033, inputs respective signals to the gate array 407 when the mode switching signal input from the external input terminal 204 is in the normal operation mode, and connects a read signal line 2031 and a write signal line 2032 to external terminals 5014 and 5015, respectively, when the mode switching signal is in the test mode. However, when the number of the external terminals connected to an SOG region 203 is small, the data on the data bus 2033 cannot be output to the outside of the microcomputer 501. Accordingly, by noting the fact that when the mode switching signal is in the test mode, the output circuit 502 is inactivated because CPU 102 is transferring signals between the SOG region 203 within the microcomputer 501, the signal of the data bus 4011 is output to the outside by using the external terminals 5011, 5012 and 5013 that are not in use. In order to do this, it is only needed to connect the data bus 4011 to the external terminal 5012 via the selection circuit 507. Debugging of the system can be done by connecting the external terminals 5014, 5015 and 5012 to the gate array provided in the outside. As in the above, even when the number of external terminals used by the SOG region is smaller than the number of signals from CPU 102, it is possible to debug the gate array 407 by using a signal of a system data bus 5017 output to another system from CPU 102.

Figure 6:
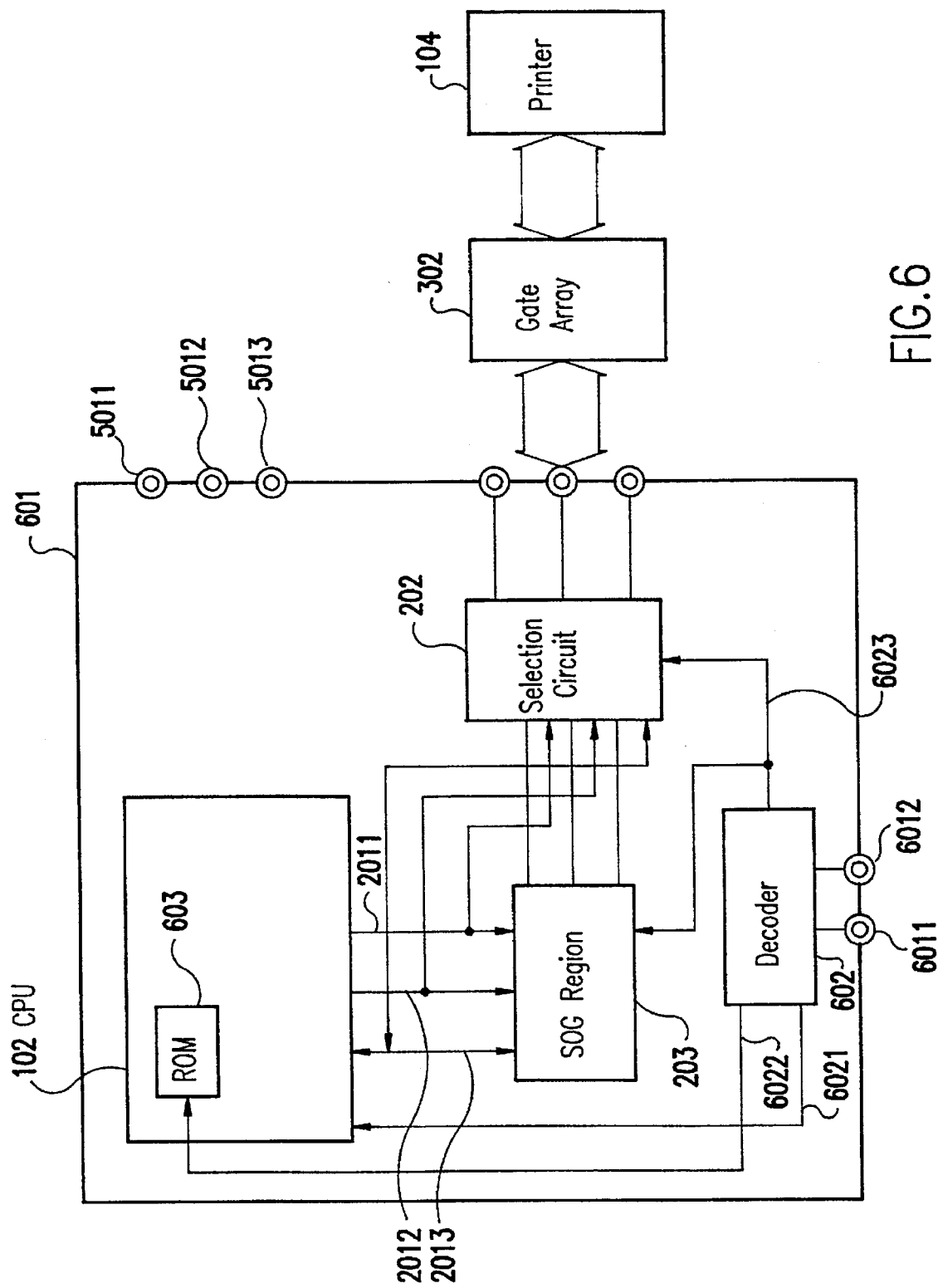
FIG. 6 is a system block diagram for a third embodiment of the microcomputer system loaded with the SOG region according to this invention.

In FIG. 6 is shown the third embodiment of this invention. A microcomputer 601 comprises a CPU 102 having a read only memory (ROM) 603, a SOG region 203, and a decoder 602 which is connected to a selection circuit 202 and external input terminals 6011 and 6012, and its control signal is input to CPU 102, ROM 603 and the selection circuit 202 via signal lines 6021, 6022 and 6023, respectively.

The decoder circuit 602 receives control signals through the terminals 6011 and 6012, and switches, based on the control signals, among the test mode of ROM 603, the test mode of CPU 102, the test mode of the SOG region 203 and the normal operation mode. When the external input terminals 6011 and 6012 are both at low levels, the control signal line 6021 alone is activated and the system goes to the test mode of CPU 102, which is the mode to confirm the operation of CPU 102 by means of information output to external terminals 5011, 5012 and 5013. When the external input terminal 6011 is high and 6012 is low, the control signal line 6022 alone is activated and the system goes to the test mode of ROM 603, and carries out the internal test of the ROM by isolating ROM 603 from the various buses and using an externally provided ROM (not shown). When the external input terminal 6011 is low and 6012 is high, the control signal line 6023 alone is activated, and the system goes to the above-mentioned test mode. Finally, when both the external input terminals 6011 and 6012 are high, none of the signal lines is activated and the system goes to the above-mentioned test mode of the normal operation.

Although in each embodiment in the above the case has been shown in which the mode switching signals are given through the external input terminals, a configuration may also be chosen where the mode switching signals are given by the CPU. Furthermore, the case where there is involved only one line for the data bus, address bus, control bus, and each signal line has been described, but the case when there are plural lines also work just as well.

What is claimed is:

1. A microcomputer for controlling a peripheral device, comprising:

a central processing unit (CPU) producing a plurality of command signals at CPU output nodes;

a sea of gate (SOG) region performing a data processing operation in response to said plurality of command signals and producing a plurality of processed data signals at SOG output nodes;

a plurality of external terminals; and a selector for coupling one of said CPU output nodes and said SOG output nodes to said plurality of external terminals, said selector responding to a mode signal to select said plurality of processed data signals to appear at said plurality of external terminals when said mode signal is in a first state to control the peripheral device, and to select said plurality of command signals to appear at said plurality of external terminals when said mode signal is in a second state to facilitate a debugging operation of said SOG region.

2. The microcomputer as recited in claim 1, wherein said SOG region is coupled to said CPU to receive said plurality of command signals, said selector comprising:

a first plurality of inputs coupled to said CPU output nodes;

a second plurality of inputs coupled to said SOG output nodes; and a plurality of outputs coupled to said plurality of external terminals, said selector forming a first plurality of electrical paths between said first plurality of inputs and said plurality of outputs when said mode signal is in said first state and a second plurality of electrical paths between said plurality of second inputs and said plurality of outputs when said mode signal is in said second state.

3. The microcomputer as recited in claim 1, wherein said plurality of SOG output nodes are coupled to said plurality of external terminals, said selector comprising:

a plurality of inputs coupled to said CPU output nodes;

a first plurality of outputs coupled to inputs of said SOG region; and a second plurality of outputs coupled to said plurality of external terminals, said selector forming a first plurality of electrical paths between said plurality of inputs and said first plurality of outputs when said mode signal is in said first state and a second plurality of electrical paths between said plurality of inputs and said second plurality of outputs when said mode signal is in said second state.

4. A microprocessor for controlling a peripheral device, comprising:

a central processing unit (CPU) for outputting CPU data signals;

a gate array integrated on a same chip as said CPU, for processing data signals from said CPU and outputting processed data signals;

a selector connected to said CPU and to said gate array, and to external terminals, said selector being responsive to a mode signal such that, in a normal mode, said selector selects said gate array to output said processed data signals to said external terminals for controlling the peripheral device, and in a bypass mode said selector selects said CPU to output said CPU data signals to said external terminals thereby bypassing said gate array to facilitate a debugging operation of said gate array.

5. A microprocessor for controlling a peripheral device as the microprocessor as recited in claim 4 wherein said gate array comprises a sea-of-gate array (SOG).

6. A microprocessor for controlling a peripheral device as recited in claim 4 further comprising:

a read-only-memory (ROM) connected to said selector;

a multi-bit mode signal input terminal; and a decoder for decoding a multi-bit mode signal for said selector such that, in a ROM mode, said selector selects said ROM to output data read out of said ROM directly to said external terminals, thereby bypassing said gate array and said CPU.

7. A microprocessor for controlling a peripheral device as recited in claim 4 wherein said mode signal comprises an external source.

8. A microprocessor for controlling a peripheral device as recited in claim 4 wherein said mode signal is generated by said CPU.

9. A method for debugging a gate array integrated on a chip with a microprocessor, comprising the steps of:

providing a selector on said chip connected to said microprocessor and said gate array;

providing output terminals for supplying signals from said chip to an external device;

selecting by said selector, in a first mode, to connect said gate array to said output terminals to control a peripheral device, and selecting, in a second mode, to connect said microprocessor directly to said output terminals thereby bypassing said gate array;

connecting an external gate array to said external terminals; and debugging said external gate array.

10. A method for debugging a gate array integrated on a chip with a microprocessor as recited in claim 9 further comprising the step of generating a mode selection signal for said selection step.

11. A method for debugging a gate array integrated on a chip with a microprocessor as recited in claim 9 wherein said gate array comprises a sea-of-gate (SOG) array.

* * * * *